(12) United States Patent  (10) Patent No.: US 9,417,120 B2
Zielke et al.  (45) Date of Patent: Aug. 16, 2016

(54) DEVICE AND METHODS FOR QUANTIFYING PLANTS USING AN ACTIVE LIGHT SENSOR FOR SCANNING PLANTS IN A DEFINED AREA

(71) Applicant: Ag Leader Technology, Ames, IA (US)

(72) Inventors: Roger Zielke, Huxley, IA (US); Chad Fick, Story City, IA (US)

(73) Assignee: Ag Leader Technology, Ames, IA (US)

( * ) Notice: Subject to any disclaimer, the term of this patent is extended or adjusted under 35 U.S.C. 154(b) by 123 days.

(21) Appl. No.: 14/245,052

(22) Filed: Apr. 4, 2014

(65) Prior Publication Data

US 2014/0299749 A1  Oct. 9, 2014

Related U.S. Application Data

(60) Provisional application No. 61/808,442, filed on Apr. 4, 2013.

(51) Int. Cl.
*A01G 7/06* (2006.01)
*G01J 1/04* (2006.01)
*G01J 1/16* (2006.01)

(52) U.S. Cl.
CPC . *G01J 1/0403* (2013.01); *G01J 1/16* (2013.01)

(58) Field of Classification Search
CPC ............... G01N 33/0098; G01N 2033/245; G01N 21/55; A01G 7/00; A01G 7/06; G01G 1/00; G01C 21/00
USPC ............ 250/221, 222.1, 559.26, 559.4; 356/406–416, 420, 425; 209/3.2, 518, 209/576–578
See application file for complete search history.

(56) References Cited

U.S. PATENT DOCUMENTS

| | | | |
|---|---|---|---|
| 3,821,550 A * | 6/1974 | Priest | A01B 41/06 250/226 |
| 5,585,626 A | 12/1996 | Beck et al. | |
| 5,789,741 A | 8/1998 | Kinter et al. | |
| 5,793,035 A * | 8/1998 | Beck | A01M 7/0089 250/222.1 |
| 7,081,611 B2 | 7/2006 | Scott | |

* cited by examiner

*Primary Examiner* — Que T Le
(74) *Attorney, Agent, or Firm* — Davis, Brown, Koehn, Shors & Roberts, P.C.; Kent A. Herink

(57) ABSTRACT

A method of quantifying growing plants in an area is disclosed wherein the area is scanned with an active light sensor which provides a data signal when a plant is present that is distinct from the data signal provided when a plant is not present. The data signal is analyzed to determine at least plant population densities, the spacing of plants, the number of emerged plants versus planted seeds, the size of the area that has unproductive plants or an estimate economic and/or yield loss. Overlapping sample areas can be used to improve the accurate quantification of plants.

18 Claims, 7 Drawing Sheets

DEVICE AND METHODS FOR QUANTIFYING PLANTS USING AN ACTIVE LIGHT SENSOR FOR SCANNING PLANTS IN A DEFINED AREA

The present application claims priority to U.S. Patent Application Ser. No. 61/808,442, filed Apr. 4, 2013, which is incorporated herein in its entirety by this reference.

BACKGROUND OF THE INVENTION

The present invention relates generally to a method for quantifying plants and, more specifically, to the use of an active light sensor to quantify plants.

It is common knowledge to growers that the amount of plants per area (stand count) is a good indicator of the yield potential and quality of planting in certain crops, especially corn. It is also known there can be a significant drop in yield when a large gap between plants occurs. This can be caused by an unintended planting skip by the seeder or a failure of the seed to germinate and emerge. There is also a drop in yield when seeds are planted too close together due to the competition for resources. Knowing the importance of stand counts, most field corn growers, seed corn growers, researchers, agronomists, and seed companies regularly perform stand counts in their fields. The biggest obstacle to an accurate stand count is the amount of plants in a single field. It is time prohibitive to count all plants in an entire field, so most growers count the number of plants in a $1/1000^{th}$ of an acre. These counts are used to assume the average stand for the entire field. This could lead to a very inaccurate count and it does not allow the growers to monitor the spatial variation of emergence.

Active light sensors can detect if a plant is present through a change in the reflection of light which is an indication of biomass of a living plant. This process has been indicated in a previous U.S. Pat. No. 5,789,741. In this patent an active light sensor is used to detect the presence of a plant. The goal of the '741 invention is to reduce product application by only applying to plants that are present. Several other patents have at least one part of their claims to be the ability to distinguish between two objects such as the soil and plants. In these claims, the difference is simple definition of a plant or soil reading. This is typically used to determine when to apply or when not to apply a product. Two examples of those claims can be seen in U.S. Pat. No. 7,081,611 and U.S. Pat. No. 5,585,626. What is lacking in this prior art is distinguishing between soil and plants for the purpose of monitoring plant population, plant spacing, economic loss from missing or damaged plants and prescribing a variable application rate that excludes sensor readings from the soil between plants.

The prior art is also lacking in additional descriptions of key features that can improve the knowledge of field conditions. Active light sensors have the ability to distinguish between plants and soil, information which can be used to count the number of plants present in the field. A second feature is the ability to determine the spacing between the plants. A third feature is determining if an area of the field is missing a plant where one should have been or if a plant is severely stunted in growth leading to little to no yield. A fourth feature is using sensors to determine the yield loss and the subsequent economic loss from unproductive plants. It should be noted that all of these features can apply to many other crops, not just corn.

Current active light sensors on the market will sample at a small rate per second when collecting data. Typically sample rates are at 1 Hz to 5 Hz. Rarely do they exceed a 10 Hz sample rate due to the amount of data that will be recorded if one logged all data values. There is a significant flaw in this sampling method as it assumes that all points sampled will be of the best view of the plants being scanned. This is not true especially in early growth row crops such as corn. If a sample is taken at anytime where more soil is scanned than plant, the reflected light of that sample will not accurately reflect the true vigor of the plant nearby. The end result is data that suggests the plant is unhealthy and needs attention. This would result in an inaccurate response such as applying more fertilizer when only a little was needed. This can be corrected by knowing if a plant is present or not at the time of the sample.

The prior art does not address sampling at a high rate and filtering the data though an algorithm to determine when a plant is sampled and when soil is sampled. If the process of filtering the data is done efficiently and accurately, the system can use data when a plant is being directly sampled and all other data sampled can be disregarded.

SUMMARY OF THE INVENTION

The invention consists of a method of counting plants using an active light sensor. The sensor collects data regarding the presence or absence of a plant. The data are analyzed at least to determine plant population densities, detect the spacing of plants, to quantify and compare the number of emerged plants versus planted seeds, to quantify the amount of area in a field that has unproductive plants and estimate economic and/or yield loss, and to use overlapping sample areas to improve the accurate counting of plants.

An object of the present invention is to provide a method of quantifying growing plants in an area by scanning the area with an active light sensor which provides a data signal when a plant is present that is distinct from the data signal provided when a plant is not present.

Another object of the invention is to provide a method wherein the data signal is analyzed to determine at least one quantity from the group consisting of plant population densities, the spacing of plants, the number of emerged plants versus planted seeds, the size of the area that has unproductive plants, and an estimate economic and/or yield loss.

A further object of the invention is to provide a method of quantifying growing plants in an area which makes use of overlapping sample areas to improve the accurate quantification of plants.

Yet another of the invention is to provide a method of quantifying growing plants in an area that uses adjacent sample areas smaller than the growing plants to improve the accurate quantification of plants by my more accurately detecting when a plant is present.

These and other objects of the invention will be recognized by those skilled in the art upon a review of this specification, the Figs. and the appended claims.

BRIEF DESCRIPTION OF THE FIGS

DETAILED DESCRIPTION OF PREFERRED EMBODIMENTS

Figure 1:
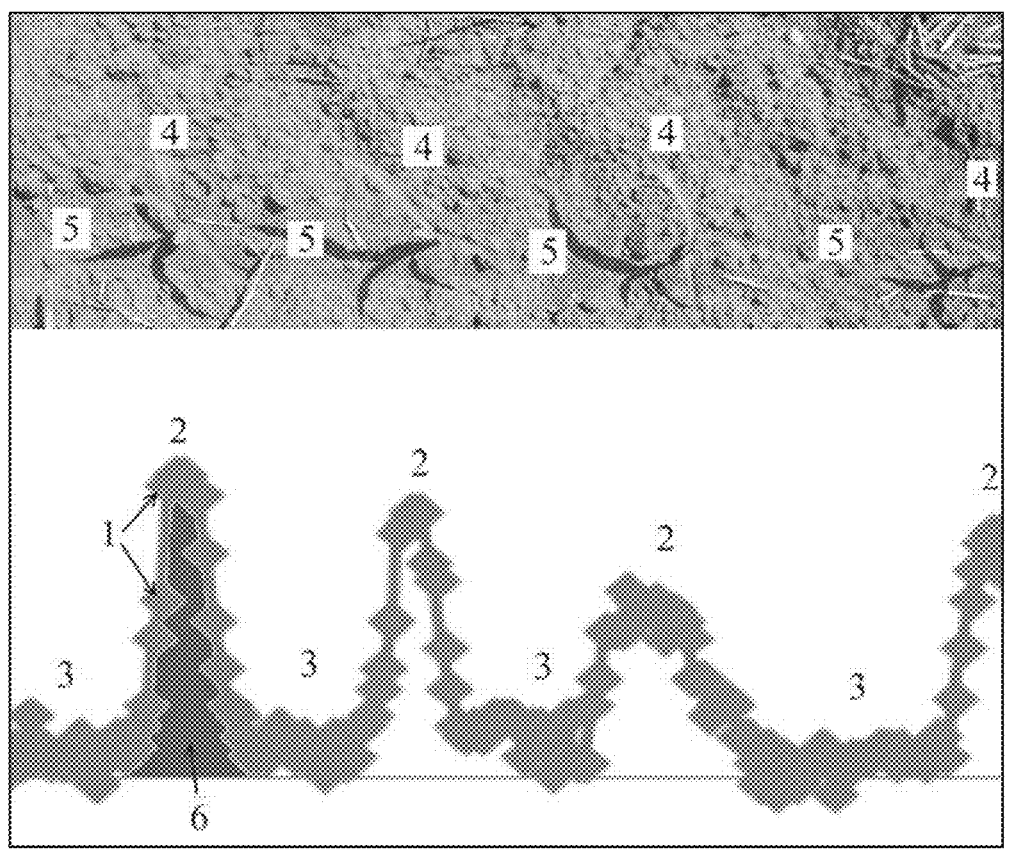
FIG. 1 is a composite of a photograph of a section of a row of corn plants and a corresponding data signal from an active light sensor used to scan the row section.

1. Using an Active Light Sensor to Count and Display On-the-Go Plant Population Per Area FIG. 1 shows a view of plants in the field and data that was recorded from scanning plants with an active light sensor (for example, the OptRx™ light sensor sold by Ag Leader Technology, Inc., Ames, Iowa) in the early growth stage where there are spaces in the plant canopy that expose soil. This figure illustrates how scanning plants with an active light sensor and recording samples 1 at a very high rate per second creates a graph of peaks 2 and valleys 3. Each peak is indicating the reflectance of light off of the center of a plant 4. Each valley indicates the soil in-between plants 5. An algorithm can be used to determine the presence of peaks. There are several methods to determine the presences of peaks in sensor data, such as the slope method in U.S. Pat. No. 5,789,741. The inventive step is counting the number of peaks and knowing the area the peaks were counted over. This will create an accurate representation of the amount of plants per area that can be recorded and displayed on a monitor.

2. Using an Active Light Sensor to Detect Spacing of Plants On-the-Go

As stated in section 1, FIG. 1 illustrates how sensor data can be used to show the location of plants and soil when there is partial canopy cover of the soil by the plants. Using the peaks 2, knowing the distance traveled, and knowing the time between each recorded sample 1 an inventive step is to use an algorithm to determine the spacing between plants by detecting distance between peaks 2.

The distance traveled will be determined by using speed that the system is traveling at and the time the samples were taken over.

Figure 2:
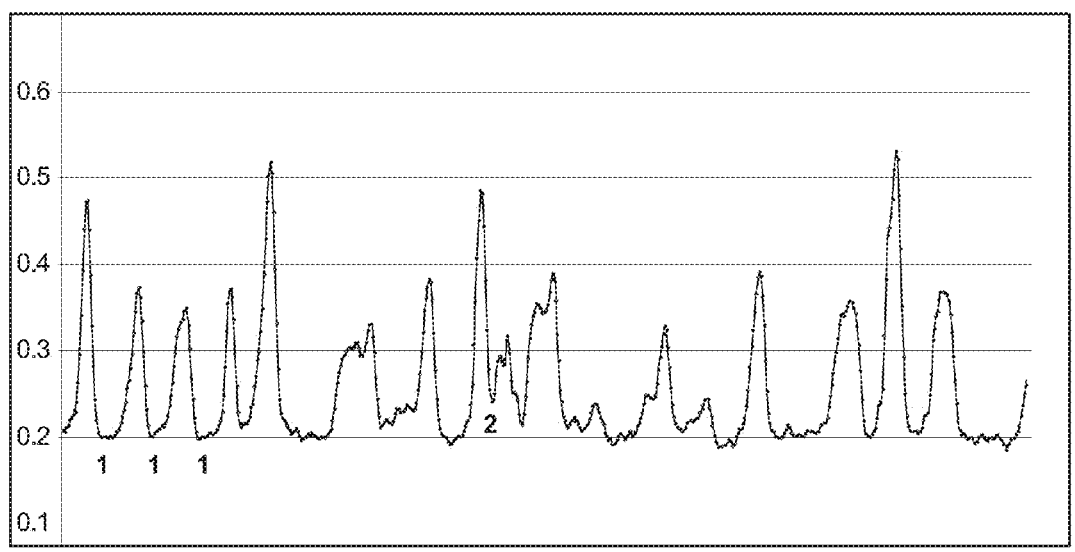
FIG. 2 is a chart of the data signal from an active light sensor used to scan a section of a row of plants that had a length of plants with normal spacing and a length of plants that were double planted at one-half normal spacing.

The magnitude of the valley between plants may be an indicator of the presence of a double plant. FIG. 2 illustrates how a normal seed spacing 1 records a low VI value when soil is scanned between plants creating deep valley between peaks. The presence of a double plant 2 is indicated by a higher VI value when little to no soil is scanned between plants creating a shallow valley between peaks.

3. Improving Active Light Sensor Values of Plants by Removing Soil Values

Current active light sensors take an instantaneous reflectance sample as an accurate representation of the true crop vigor. This can lead to inaccurate values recorded when a sample is taken from mostly soil. Inaccurate values will occur far more often when the crop does not completely cover the soil as shown in FIG. 1. The inventive step is to record the accurate values by sampling at a higher rate, determine the difference in samples between the plants 2 and the soil 3, and then remove the values related to the soil 3. Removal of the soil readings can be done several ways. A first way is to assume the value at the peak 2 of the plant scan represents the accurate crop vigor. The system is determining the accurate values by only looking at the peak values. A second way is to use the area under the curve 6 when a plant is scanned. When a plant is scanned a change in the area under the curve 6 will be detectable when compared to the soil samples 3. The system is determining the accurate value of the plant by the area under the curve. A third way is to discard soil readings and average only readings from plants. Soil readings could be discarded by a threshold or an algorithm detecting valleys of sensor readings.

Figure 3:
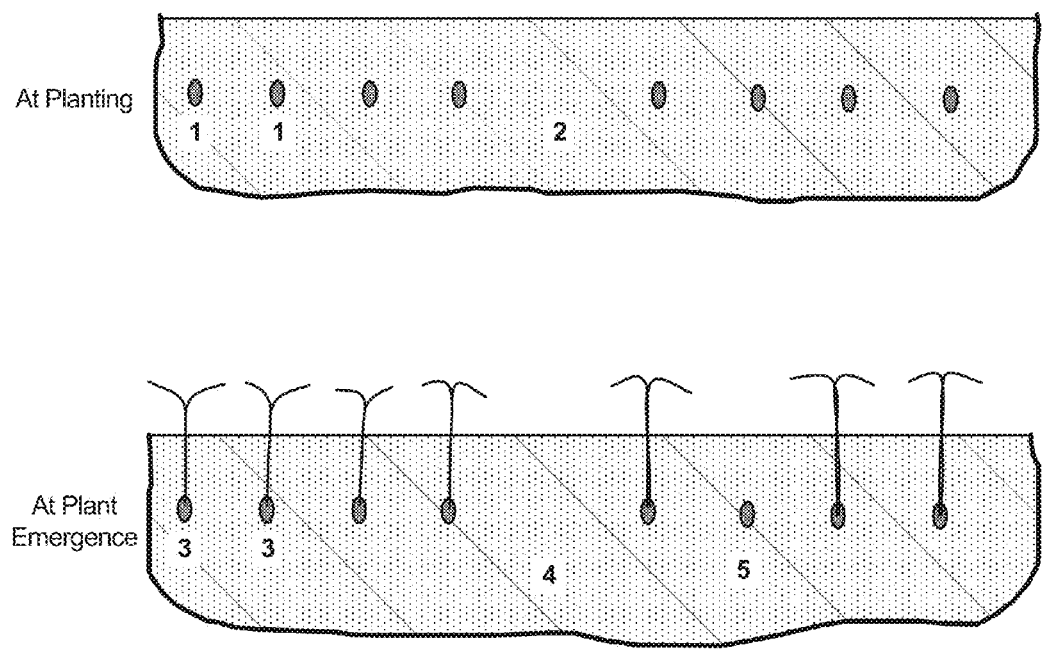
FIG. 3 is a schematic representation of skipped planting of seeds and failed emergence of planted seeds.

4. Using an Active Light Sensor to Quantify and Compare the Amount of Emerged Plants Vs. Planted Seeds Seed monitors can detect and map when a planter skips a seed when planting. When used with a seed monitor map, the sensors can estimate how many of the missing plants are due to failed emergence and how many are due to skips in planting. FIG. 3 illustrates a scenario where a planter placed seeds 1 in the soil. In the processes of planting, the planter skipped a spot in the field where a seed should have been placed 2. Once emergence of the plants begins 3, sensors would detect the skipped seed 4 by no presence of a plant above the soil, but it would also detect the failed emergence 5 by no presence of a plant above a location where a seed should have been planted. The innovative step would occur in the comparison of the skip locations from the planter data to the skips in plant presence from the sensor data. If a seed was planted, but the active light sensors detect no plant in the field, it can be assumed that the seed failed to emerge.

Figure 4:
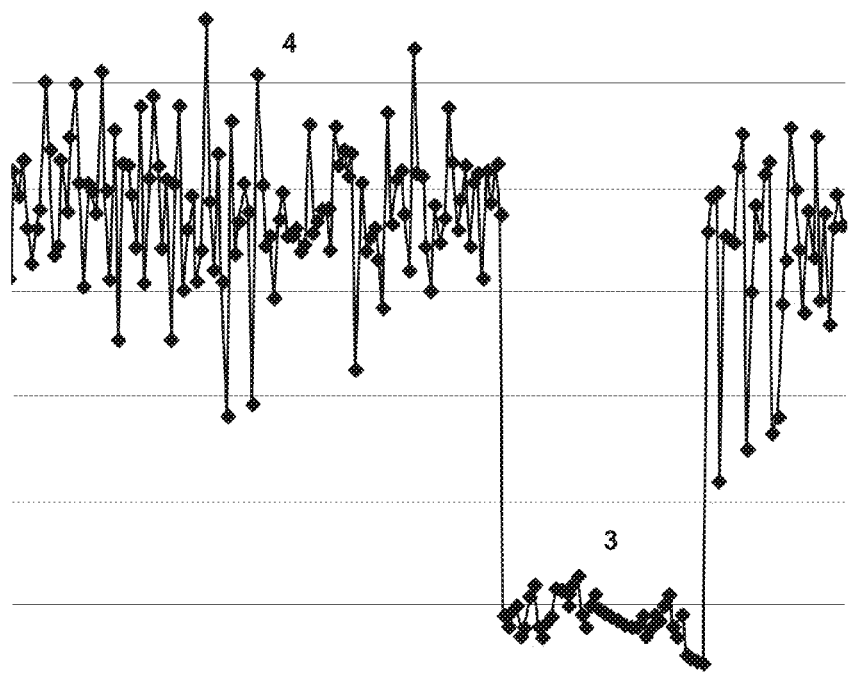
FIG. 4 is a composite of a photograph of a section of a field of corn plants where there is an area with missing plants and a corresponding data signal from an active light sensor used to scan the section of the field.
Figure 4:
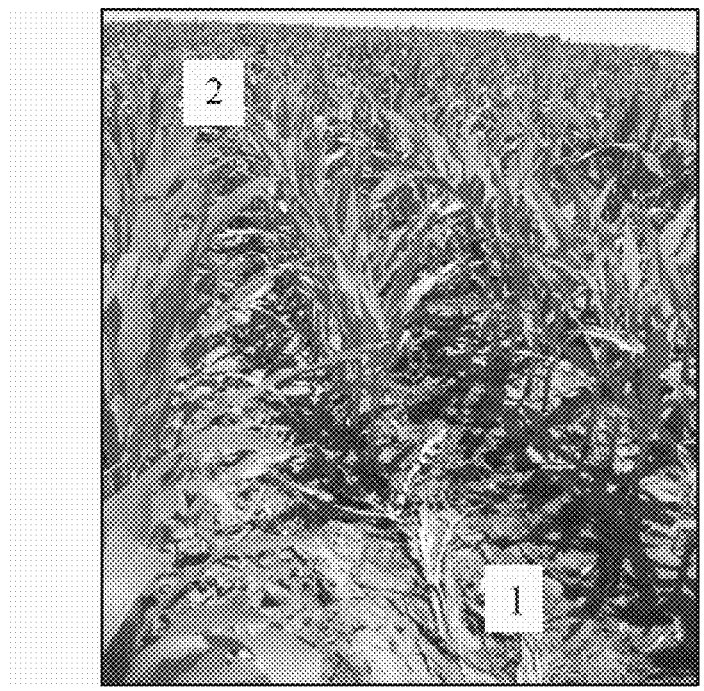

5. Using an Active Light Sensor to Quantify the Amount of Area in a Field that has Unproductive Crops Most crops will eventually grow to cover the soil with a canopy of leaves. FIG. 4 illustrates the fact that without any gaps in the canopy 2 to determine if the active light sensor scan is of plant or soil there is no way to determine the plant population on-the-go at later growth stages. An inventive idea is using the sensors to detect a gap in the canopy of a crop 1 which will be displayed on a graph as a valley 3. An algorithm can then quantify the amount of area that has plants 4 and what areas do not have any plants present 3. In addition the algorithm can indicate areas of significantly stressed plants which would result in little to no yield.

The way to quantify the unproductive parts of the field can be done by calculating a percentage or number of unproductive plants per area.

6. Using an Active Light Sensor to Detect Missing or Unproductive Plants and Estimate Economic or Yield Loss When a system determines the percentage or number of unproductive plants in a field, an inventive step will be to create an estimated yield loss and the economic loss while scanning with the active light sensors. Independent research has estimated that missing 1000 plants of corn per acre can cause a loss of yield that ranges from 4 to 7 bushels. The system can calculate the amount of yield each missing plant could have yielded then create an estimate of value lost due to the yield loss based on what the current value of the crop is on the market. Prior art for this concept can be seen in U.S. Pat. No. 8,078,367 which claims to estimate yield losses from missing plants while monitoring planting.

Figure 5:
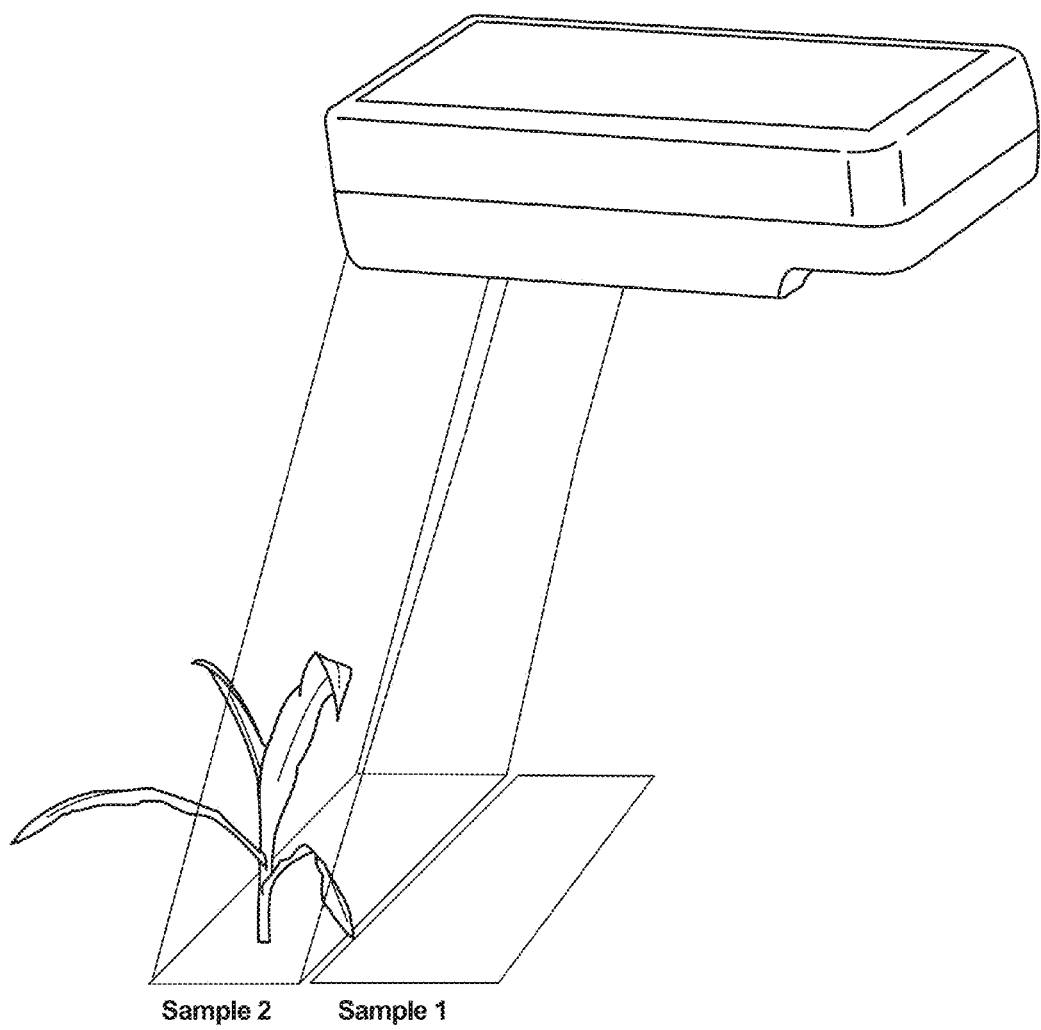
FIG. 5 is a schematic representation of an active light sensor scanning adjacent sample areas, one without a plant present and one with a plant present.
Figure 6:
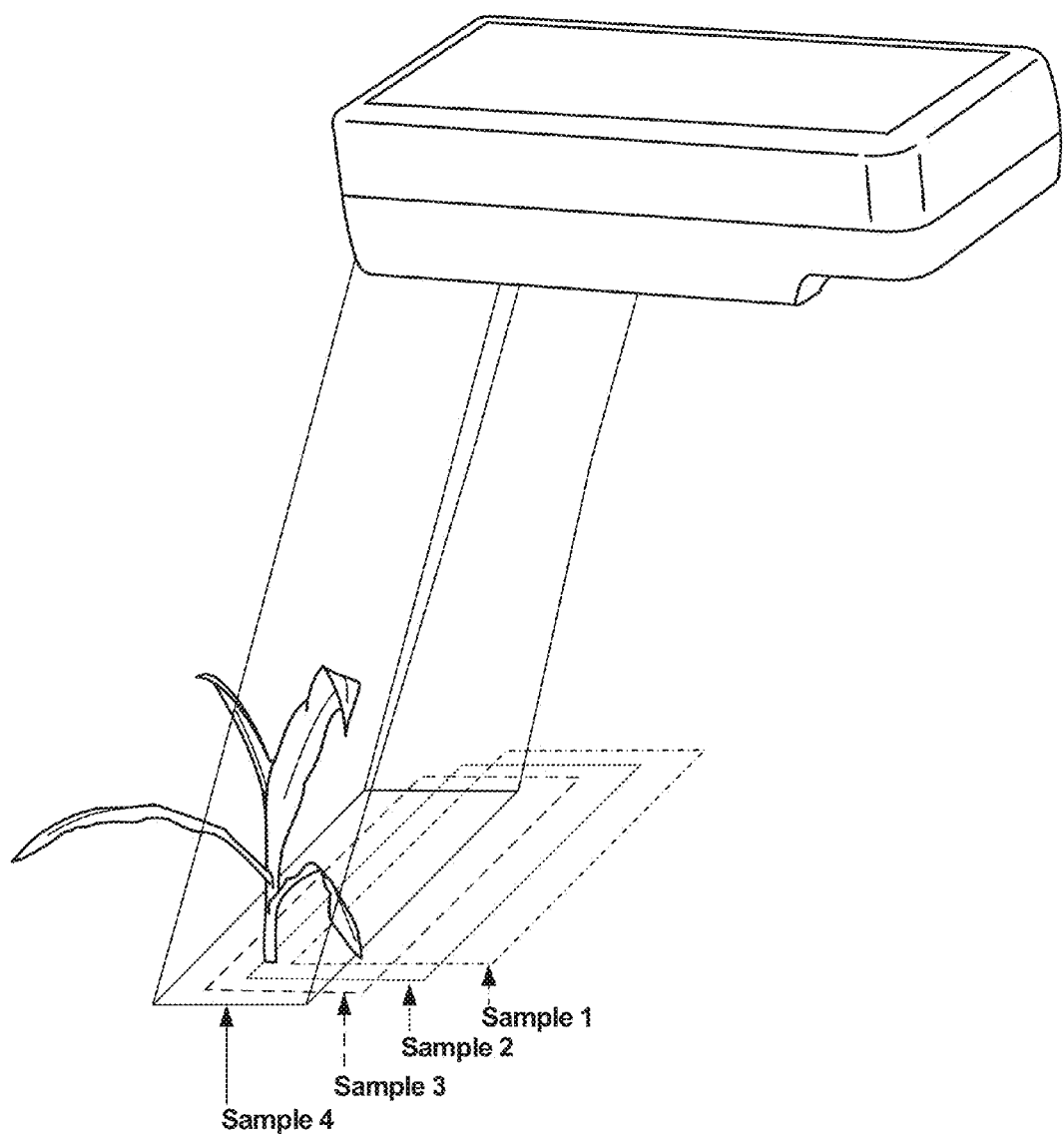
FIG. 6 is a schematic representation of an active light sensor scanning overlapping sample areas.

7. Using Overlapping Samples from an Active Light Sensor to Create a Smooth Data Sample to Better Identify Peaks and Valleys When the system shines a light on a plant, the scanned area or "footprint" of light affects the quality of data recorded by reflecting light from a large or small area. If each sample is taken where there is no overlap between footprints, the data may be very erratic with peaks and valleys difficult to identify. FIG. 5 illustrates this by comparing the footprint of Sample 1 which reflected no light off of a plant, but Sample 2 is a full scan of a plant which leads to an abrupt and erratic increase in reflectance when comparing the reflected value of both footprints. A unique idea is to overlap footprints which will detect slight variations in light reflected due to plant leaf structure. This will create a smoother data line making it easier to identify peaks and valleys. FIG. 6 illustrates Sample 1 footprint is on fewer leaves which reflects a smaller amount of light than Sample 2, Sample 3, and Sample 4. This creates a smooth peak, accounting for the change in biomass from a single plant.

8. Using a Variable Sized Footprint Based on Speed Traveling, Growth Stage, and Plant Spacing for Optimal Overlapping Samples for Smoother Peaks and Valleys Given that the footprint of a light sensor is important as described in section 7 above, a unique idea is to adjust the area scanned (the sensor footprint) to make better defined peaks and valleys out of the sensor data. Increasing or decreasing the footprint of the area scanned based on the speed the sensors are traveling, the growth stage of the plants scanned, and the plant spacing in the field will improve the smoothness of the data collected making a more accurate identification of peaks and valleys.

Moving the sensor up or down relative to the crop is a means to optimize the light footprint.

Restricting or unrestricting active light shined from sensor is a means to optimize the light footprint. For example, a shutter on the sensor could be moved to block light or expose more light from the sensor's active light source.

Varying the frequency of readings taken by the sensor is another method to optimize the light footprint.

9. Detecting Reflectance Light with Two Separate Methods to Create a Smooth Detection Curve, Making it Easier to Identify a Peak and a Valley Adding detail to section 8, averaging readings from sensors can be accomplished by two methods (both are equally effective) to create smooth peaks and valleys on a plant detection curve. The first averaging method is taking reflectance samples that overlap each other as described in Section 7 and demonstrated in FIG. 6. This method does not average values between samples, but creates an averaging effect by sampling large portions of the previous sample. This can be seen in FIG. 6 where Sample 2 is covering much of the area Sample 1 covers, but it is also sampling near area as well. This method will cause a gradually build up of an upcoming plant by sampling the outlier leaves in a gradual buildup to the core of the plant creating a smooth sample curve without averaging the readings.

Figure 7:
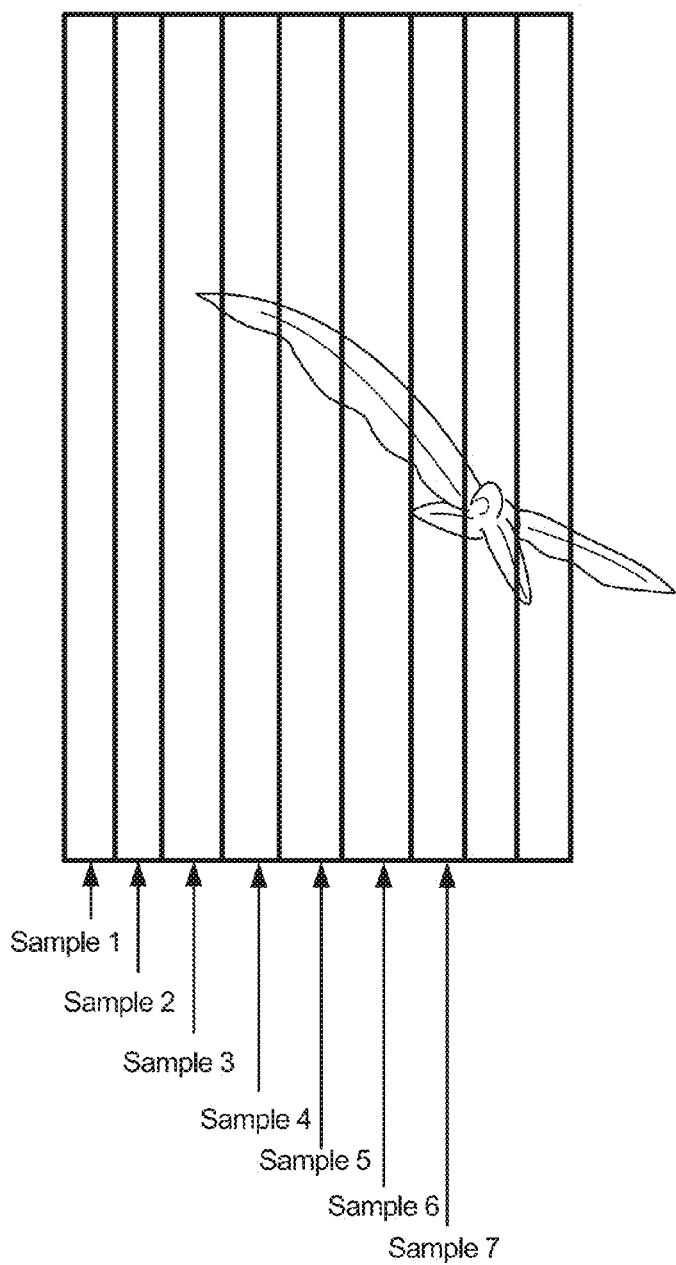
FIG. 7 is a schematic representation of an active light sensor scanning adjacent sample areas that are smaller than the size of plants being detected.

A second method is to have a running average of smaller samples as demonstrated in FIG. 7. Samples will be taken in narrow samples that do not overlap each other. Contiguous samples will be used to calculate an average for a defined area, the next sample taken will be added to the continuous samples, and the first sample is dropped from the average. An example of this method using FIG. 7 would start with an average of reflectance values taken from Sample 1 through Sample 5 to create the first averaged value. The second averaged value would be taken from Sample 2 through Sample 6, and the third averaged values would be taken from Sample 3 through Sample 7. The number of samples and sample size could be altered for optimal performance depending on field setup, conditions, crops or many other variables.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

We claim:

1. A method of quantifying growing plants in a defined area, comprising scanning the defined area with an active light sensor which provides a data signal for light reflected when a plant is present that is distinct from the data signal provided when a plant is not present and analyzing the data signal in order to assess one or more crop parameters within the defined area.

2. The method as defined in claim 1, wherein the data signal is analyzed to determine plant population density in the defined area by taking into account variations in light reflected.

3. The method as defined in claim 1, further comprising using overlapping sample areas within the defined area in order to improve the accuracy of the growing plant count.

4. The method as defined in claim 1, further comprising using adjacent sample areas smaller than the defined area in order to improve the assessment of the one or more crop parameters by more accurately detecting when a plant is present.

5. The method as defined in claim 1, wherein the one or more crop parameters is determining the spacing of plants in the defined area.

6. The method as defined in claim 1, wherein the one or more crop parameters is determining the number of emerged plants versus planted seeds in the defined area.

7. The method as defined in claim 1, wherein the one or more crop parameters is determining the percentage of emerged plants in the defined area.

8. The method as defined in claim 1, wherein the one or more crop parameters is determining the size of the area that has unproductive plants.

9. The method as defined in claim 1, wherein the one or more crop parameters is estimating economic and/or yield loss due to unproductive or missing plants.

10. A device for counting plants in a defined area comprising:

at least one active light sensor that scans a defined area and provides a data signal for light reflected when a plant is present that is distinct from the data signal provided when a plant is not present;

wherein the device is capable of analyzing a plurality of data signals in order to assess one or more crop parameters.

11. The device as defined in claim 10, wherein the one or more crop parameters is determining the plant population in the defined area.

12. The device as defined in claim 10, wherein the one or more crop parameters is determining the spacing between plants in the defined area.

13. The device as defined in claim 10, wherein the one or more crop parameters is determining the number of missing plants in the defined area.

14. The device as defined in claim 10, wherein the one or more crop parameters is determining the percentage of missing plants in the area.

15. The device as defined in claim 10, wherein the one or more crop parameters is determining the number of emerged plants versus planted seeds in the defined area.

16. The device as defined in claim 10, wherein the one or more crop parameters is determining the percentage of emerged plants in the defined area.

17. The device as defined in claim 10, wherein the one or more crop parameters is estimating economic and/or yield loss due to unproductive or missing plants.

18. A method of quantifying growing plants, comprising:

scanning a defined area with an active light sensor which provides a data signal for light reflected when a plant is present that is distinct from the data signal provided when a plant is not present;

using overlapping sample areas within the defined area in order to account for variations in light reflected due to plant leaf structure; and analyzing the data signals in order to assess one or more crop parameters, wherein using overlapping sample areas improves the accuracy of the growing plant count and the analysis of the one or more crop parameters.

* * * * *